United States Patent
DeConti

(10) Patent No.: US 10,177,642 B2
(45) Date of Patent: Jan. 8, 2019

(54) SEALESS, LIQUID COOLED EDDY CURRENT ENERGY ABSORPTION SYSTEM

(71) Applicant: John Peter DeConti, Bristol, CT (US)

(72) Inventor: John Peter DeConti, Bristol, CT (US)

( * ) Notice: Subject to any disclaimer, the term of this patent is extended or adjusted under 35 U.S.C. 154(b) by 627 days.

(21) Appl. No.: 14/789,940

(22) Filed: Jul. 1, 2015

(65) Prior Publication Data

US 2016/0006334 A1 Jan. 7, 2016

Related U.S. Application Data

(60) Provisional application No. 62/020,058, filed on Jul. 2, 2014.

(51) Int. Cl.
| | |
|---|---|
| *H02K 49/04* | (2006.01) |
| *F16D 63/00* | (2006.01) |
| *H02K 49/10* | (2006.01) |
| *B60T 13/58* | (2006.01) |
| *H02K 5/20* | (2006.01) |
| *H02K 9/19* | (2006.01) |

(52) U.S. Cl.
CPC ............ *H02K 49/04* (2013.01); *B60T 13/586* (2013.01); *F16D 63/002* (2013.01); *H02K 5/20* (2013.01); *H02K 49/10* (2013.01); *H02K 9/19* (2013.01)

(58) Field of Classification Search
CPC ...... B60T 13/586; H02K 49/04; H02K 49/10; H02K 5/20; F16D 63/002; F16D 65/853; F16D 55/40; F16D 65/00; F16D 55/24; F16D 2055/0058; F16D 2065/784; F16D 2065/785

USPC ........ 301/112–114, 52, 57, 59, 64, 74–75 R, 301/76, 77, 92, 93, 123, 84
See application file for complete search history.

(56) References Cited

U.S. PATENT DOCUMENTS

| | | |
|---|---|---|
| 3,488,535 A | 3/1970 | Baermann |
| 5,003,839 A | 4/1991 | Yang |
| 5,358,077 A | 10/1994 | DeConti |
| 6,478,126 B2 * | 11/2002 | Drecq ...................... H02K 9/22 |
| | | 188/264 D |
| 8,196,720 B2 | 6/2012 | DeConti |
| 2013/0234542 A1 | 9/2013 | Li et al. |
| 2013/0341136 A1 | 12/2013 | Boonpongmanee et al. |

* cited by examiner

*Primary Examiner* — Naishadh Desai
(74) *Attorney, Agent, or Firm* — Devlin Law Firm LLC; James M. Lennon

(57) ABSTRACT

The disclosed apparatus relates to a non-frictional, rotational, continuous energy absorbing device utilizing internal liquid cooling and having no dynamic seals. The apparatus is comprised of a rotor assembly containing magnets, cooling chambers containing magnetically driven impellers, actuators to adjust the axial positioning of said chambers, and other variations of the apparatus including an air-cooled design and additional friction braking. Braking torque is generated through shearing of eddy currents as the cooling chambers are moved axially closer to the rotor by actuators. The same action also drives magnetically driven impellers, resulting in coolant flow. Braking energy absorption increases as does coolant flow as the distance between the cooling chambers and the rotor is decreased. As the distanced between the rotor and cooling chambers increase, both energy absorption and coolant flow decrease to zero. The coolant flows from the cooling chambers to a heat exchanger to dissipate the energy.

19 Claims, 9 Drawing Sheets

SEALESS, LIQUID COOLED EDDY CURRENT ENERGY ABSORPTION SYSTEM

BACKGROUND OF THE INVENTION

Field of the Invention

The present invention relates to a rotational energy absorbing device that incorporates internal liquid cooling and utilization of eddy currents from permanent magnets.

Description of Prior Art

Eddy current brakes (ECB's) have been around for many years, mostly air-cooled. The air cooled ECB's usually use cast iron or steel for rotor materials, which absorb the thermal energy created into its mass, and most of them utilize a fan designed into the rotors to create windage to enhance cooling. Liquid Cooled Disc Brakes (LCDB's) have also been around for years, utilizing internal cooling. LCDB's have been made with copper and aluminum rotors as well as other materials. Most of the LCDB's have required a rotational seal, these seals add a level of complexity to the device, and many factors can come into play to cause these seals to fail. There have also been ECB's that are liquid cooled, but not with internal cooling, primarily in a coolant bath. Liquid cooling has been chosen over air cooling in many applications for several reasons including: 1) to provide a higher level of energy absorption, 2) to provide fade free long duration braking, and 3) to provide a more compact design having higher power density.

Generally speaking, friction brakes and eddy current brakes create heat to absorb energy. All air cooled brakes have a limited thermal mass, and are capable of absorbing energy a rate which is greater than the air cooling is capable of dissipating. A limited thermal mass and an unlimited absorption of energy results in temperatures that increase to high levels. In air cooled friction brakes, high temperatures result in excessive wear of friction material, increased thermal stresses, and decreased capacity to absorb energy (brake fade). Yet another negative of air-cooled friction brakes is the pollution they cause. Toxic gases and toxic particles are emitted into the environment, the effects of which are just recently being recognized, resulting in new legislation to eliminate constituents in the manufacturing of friction material and thereby into the environment. In air cooled eddy current brakes, although there is no wear since there is no friction, however, there is still brake fade and high thermal stresses. In both cases, high thermal stresses result in failures of rotors and drums.

Also generally speaking, liquid cooled frictional braking systems fall into 2 main categories; 1) internally liquid cooled with rotating seals, 2) internally liquid cooled with non rotating cooling chambers. Examples of the first category can be found in U.S. Pat. Nos. 5,003,829, 5,358,077 and 8,196,720, all of which are by the present inventor. All of these patents describe systems that have an internally cooled frictional disc brake, and one or more rotating seals. Each of these patents was an improvement over the previous ones, and one problem they all had in common was creating a cost effective means of sealing them. Seals can be damaged by many things, such as lack of lubrication, contaminants in the coolant, heat, pressure, or velocity. Also, in manufacturing, surface conditions of mating surfaces such as hardness, flatness, smoothness, concentricity, materials density, and general quality control are critical to successful product. In actual use, vibration can also be an issue to make sealing difficult. If everything is correctly made and quality of manufacturing is respectable, and having proper inspection, these designs all work. However, quality control and inspection are intangible expenses that are easily overlooked, which will result in product failures. This new invention eliminates many of these issues by eliminating rotating seals, and therefore will be less costly and less problematic.

The second category is based on U.S. Patent Publication No. 20130341136 and earlier versions of similar design. In this design, a rotating disc made of friction material is placed between two cooling chambers. The cooling chambers do not rotate, and they have coolant pumped through them by external pumps, and the chambers have wear surfaces that are pressed against the friction disc to create braking torque. These designs do have components that wear during normal use, they require external pumps to flow coolant, and they have a flow path that creates a temperature differential in the wear surfaces which results in thermal distortion and a pulsation in torque output. The patent sited above has improved on earlier designs by using four cooling chambers per friction face, to minimize the thermal distortion.

Other products are based on eddy current energy absorption as described in U.S. Pat. No. 744,423 and uses electromagnets opposed to air cooled cast iron rotors. Like other air cooled brakes, they get hot and they experience brake fade and thermal stresses. They also have parasitic windage losses, which in trucking driveline use results in lower fuel economy. Another product uses permanent magnets and is described in U.S. Pat. No. 3,488,538. This product is also air cooled, and again has limited energy absorption but without the high amperage draw requirement that electromagnet requires, and with lower weight. Another patent publication, U.S. 20130234542, describes a liquid cooling self-excitation type eddy current retarder with salient pole structure, but not with magnets creating the energy absorption or magnetically driven impellers to provide flow. U.S. Pat. No. 6,478,126 is yet another example without the features of this new invention, having rotating seals, no magnetically driven impellers and more differences to numerous too describe here.

SUMMARY OF THE INVENTION

The present invention is designed to overcome the limitations of the prior art and provide a new way to providing continuous braking with liquid cooling. By the elimination of costly dynamic seals, friction material, and high amperage electromagnetic coils, a high power density as well as cost effective approach has been realized.

A specific embodiment of the present invention makes use of high strength rear earth magnets in a rotor assembly. The rotor assembly of one embodiment is constructed of two plates of aluminum, fitting the magnets in between them so they are retained in every direction. The two aluminum plates are held together by fasteners, and mounted to a shaft. On each side of the rotor is a cooling chamber which is capable of moving axially towards and away from the rotor. This is accomplished by actuators but can also be simple air or hydraulic cylinders. The faces of the cooling chambers adjacent to the rotor assembly are electrically conductive material, such as copper or aluminum, but it should be noted that these are not the only materials that can be used for this component. Pumping is created by a magnetically driven impeller contained in the cooling chambers. The cooling chambers are statically sealed with O-rings, gaskets or other means, and plumbed to a closed loop cooling system by hose connections.

The result of this unique design is a virtually zero maintenance device due to elimination of braking friction and low temperature operation due to liquid cooling. Furthermore, without dynamic seals, it is a more robust and cost effective device. And by utilizing permanent magnets instead of electromagnetic coils, it is less complicated, lighter and does not require a high amperage draw. Yet another advantage is that it uses magnetically driven pumping, not external pumps, the pumping action is only when braking occurs.

DETAILED DESCRIPTION OF THE ILLUSTRATED EMBODIMENTS

Braking is controlled by positioning the stationary cooling member(s) closer to or further from the rotating magnets. Coolant flow can be created by convection, or by use of ferromagnetic fluids and their interaction with the rotating magnets, and/or by use of a magnetic pump drive arrangement. The coolant flow path is matched to the magnet placement, in a spiral path, or a straight path if the design is to be implied. Hose connections are made to the stationary member, no rotating seals are needed. Braking energy is a function of RPM, mean effective radius, magnet strength, and distance between the rotor and the stationary cooling member.

Figure 1:
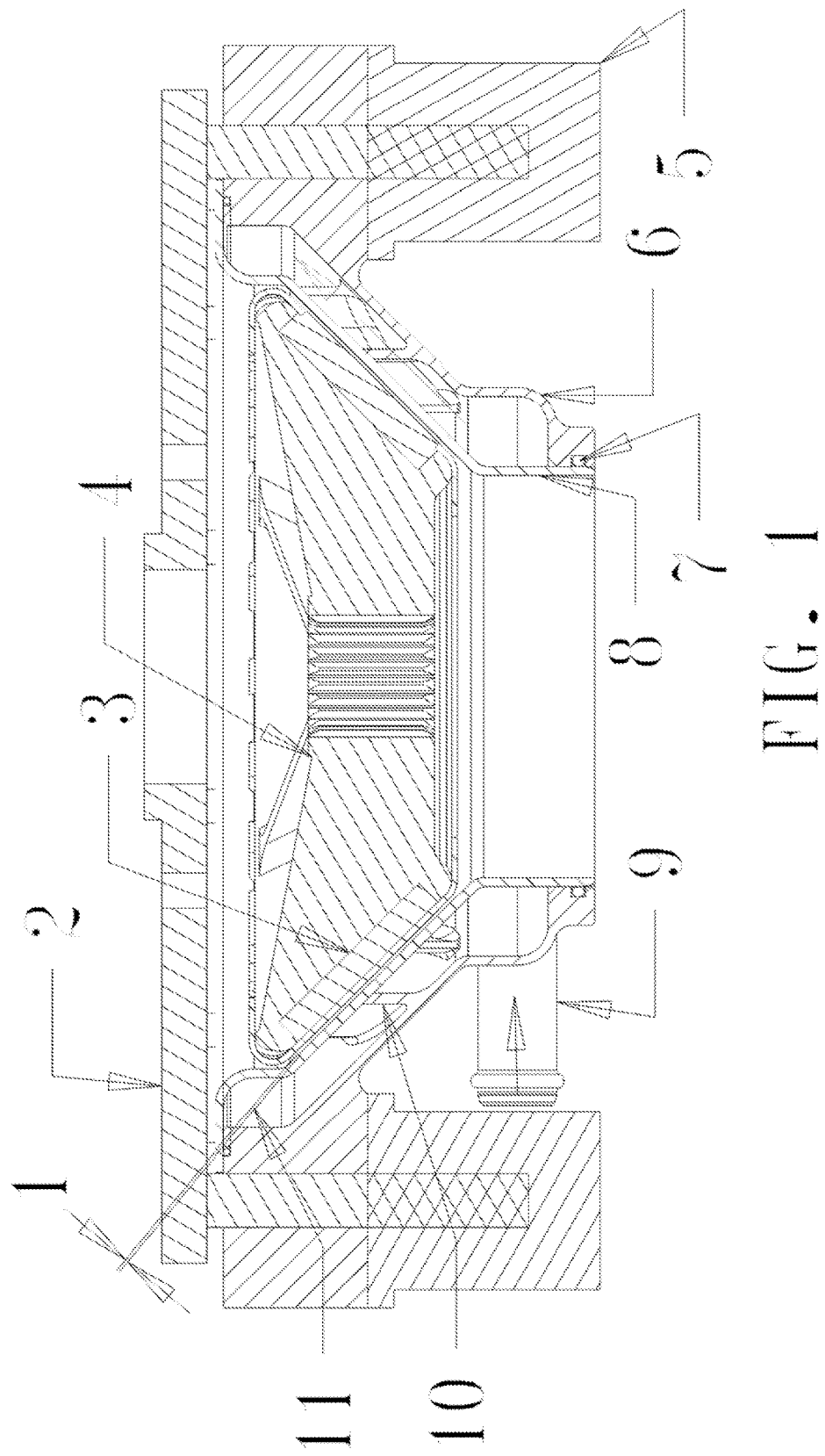
FIG. 1 is a crossectional drawing of full assembly of an embodiment.

FIG. 1 shows a crossectional drawing of an exemplary, fully assembled liquid cooled eddy current energy absorbing device. 1 refers to the operating gap when the device is fully engaged. The smaller the gap 1 the greater the braking torque. Gap 1 is increased to vary the braking or to turn it off completely. The Torque Reaction Adapter Plate 2 transmits the torque from the coolant housing 6 through the shafts of the Actuators 5 to the bolt pattern near the center. The Magnets 3 are place in pockets in the Rotor 4. The assembly is sealed by static O-rings 7 and a second not clearly visible in the view. Eddy currents react through the Inner Stamping 8 which could be copper, aluminum, steel or other electrically conductive materials. Coolant flows into the Inlet Hose Connection 9 and is directed by Vanes 10 to Outlet 11, not clearly shown in this view.

Figure 2:
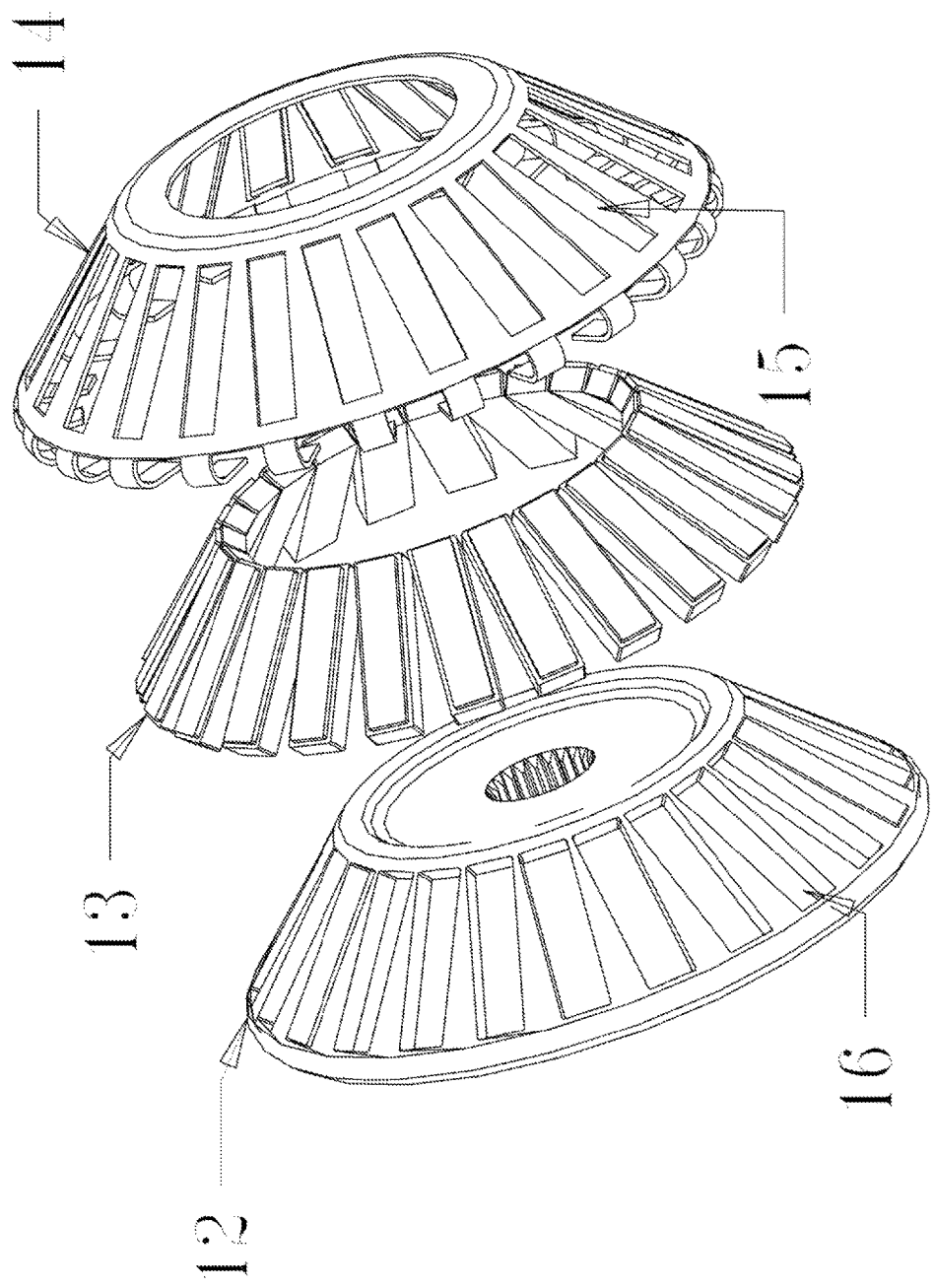
FIG. 2 is an isometric exploded view of the rotor assembly for the same embodiment.

FIG. 2 is an isometric exploded view of the exemplary rotor assembly, showing how the Rotor 12, Magnets 13, and Retaining Stamping 14 fit together. Matching Profiles 15 retain the Magnets 13 which have a step in the design to keep them in the Magnet Pockets 16. It should be noted that the "fingers" on the outer diameter of retaining stamping 14 only get formed inward as the last step in assembling these components. The rotor as shown has an internal spline to attach to a shaft.

Figure 3:
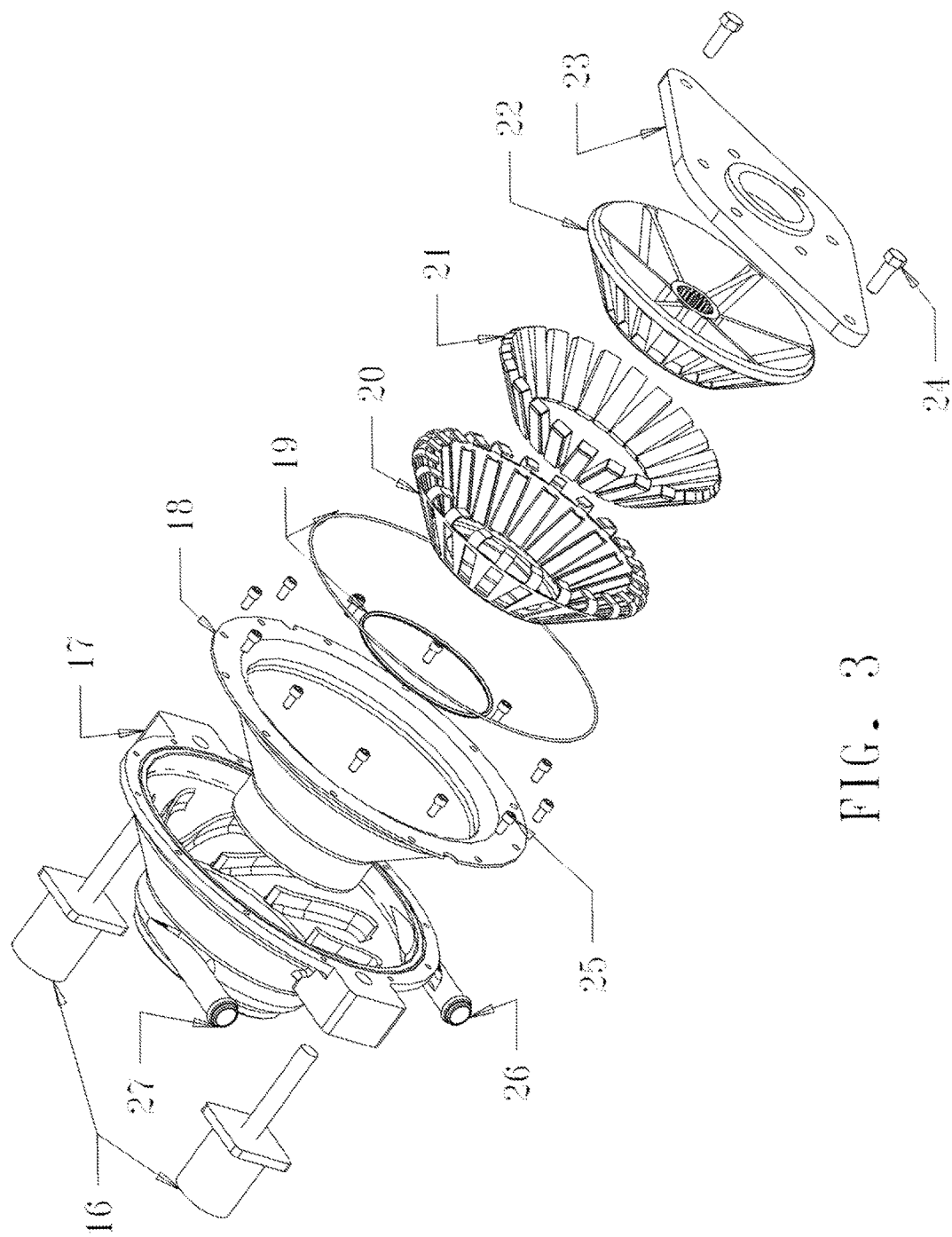
FIG. 3 is an isometric exploded view of the entire assembly of the same embodiment.

FIG. 3 is an isometric exploded view of the entire assembly of one possible embodiment. The Actuators 16 could be simple air or hydraulic cylinders to move the Cooling Assembly 16, 17, 18, 19, and 25 back and forth, engaging or disengaging the energy absorption. The Actuators 16 could also be electrically engaged, as in a solenoid or a screw driven device, which can vary the distance shown in FIG. 1, Gap 1, which will vary the energy absorption. It should also be noted that there could be two, three or more actuators as the design requires for any particular application. Cooling Chamber 17 is actually shown in this position so that the two Hose Connections 26 and 27 could be shown as well as the blades on the inside. It should be noted that in use, this would be rotated 180 degrees. 27 is the Inlet Connection, 26 is the Outlet Connection, 18 is the Inner Stamping, which could be aluminum, copper or steel or other electrical conductive material. Material choice is based on cost and performance of a particular application and is not limited to the three materials mentioned. Inner Stamping 18 is sealed by O-rings 19 and retained by Bolts 25. The Retaining Stamping 20, Magnets 21 and Rotor 22 have been described in more detail in FIG. 2. The Adapter Plate 23 is designed to provide attachment to whatever device which is required to attach to, such as a transmission or engine, but the application is not limited to these options. Bolts 24 attach the rods of the Actuators 16 to the Adapter Plate 23.

Figure 4:
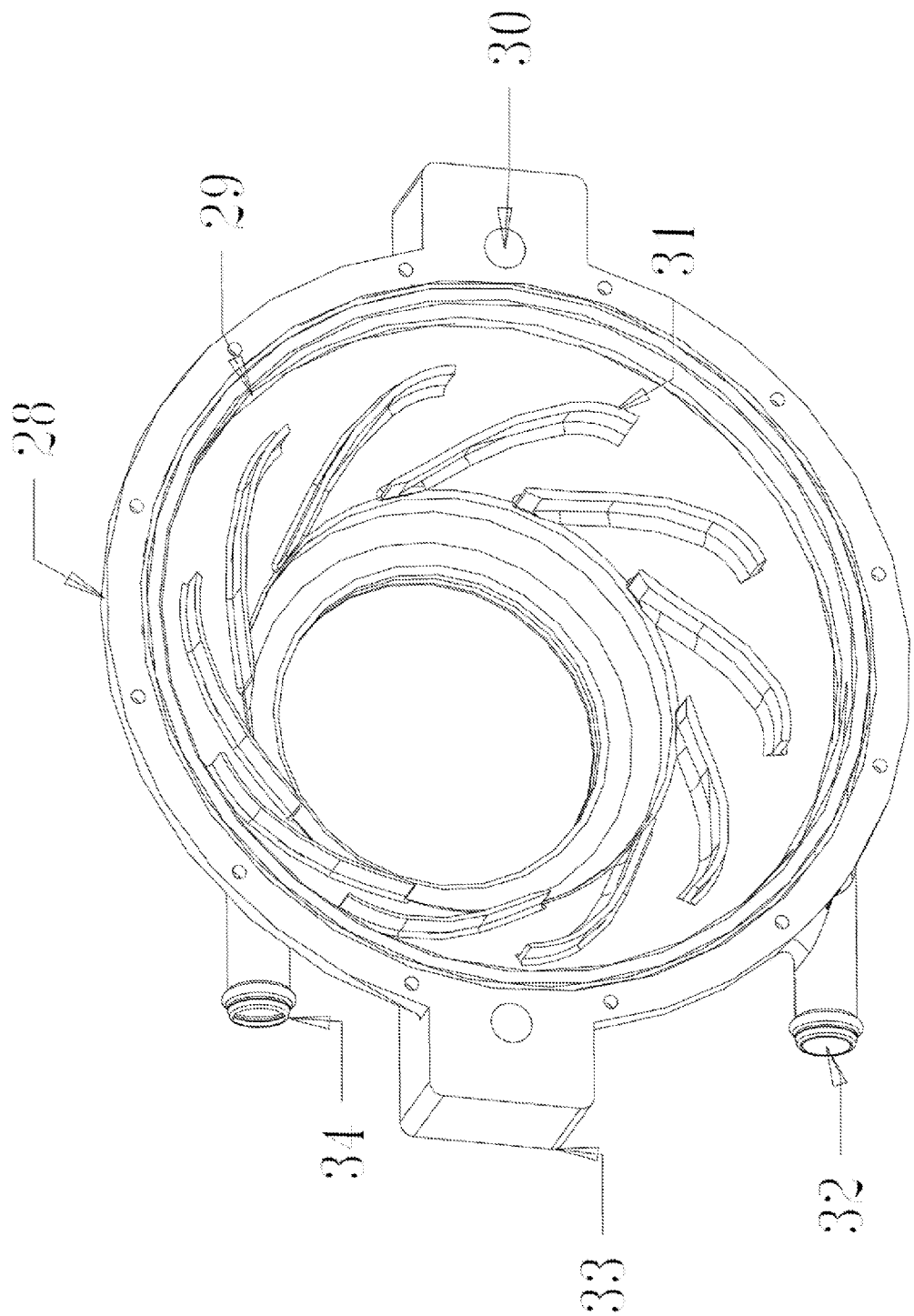
FIG. 4 is an isometric view of the cooling chamber of the same embodiment.

FIG. 4 is an isometric view of the exemplary Cooling Chamber 28. The Cooling Chamber is again shown 180 degrees from the installed position to show both the Inlet Connection 34 and the Outlet Connection 32 as well as the Vanes 31. O-Ring Groove 29 is clearly shown in the view. Actuator Mounting Boss 33 is representative of material needed to mount various types of linear actuators, and Actuator Rod Hole 30 serves as both a means to allow the actuator rod to pass through to the Adapter Plate or similar structure, but also to transmit torque from the Cooling Chamber Assembly to the Adapter Plate.

Figure 5:
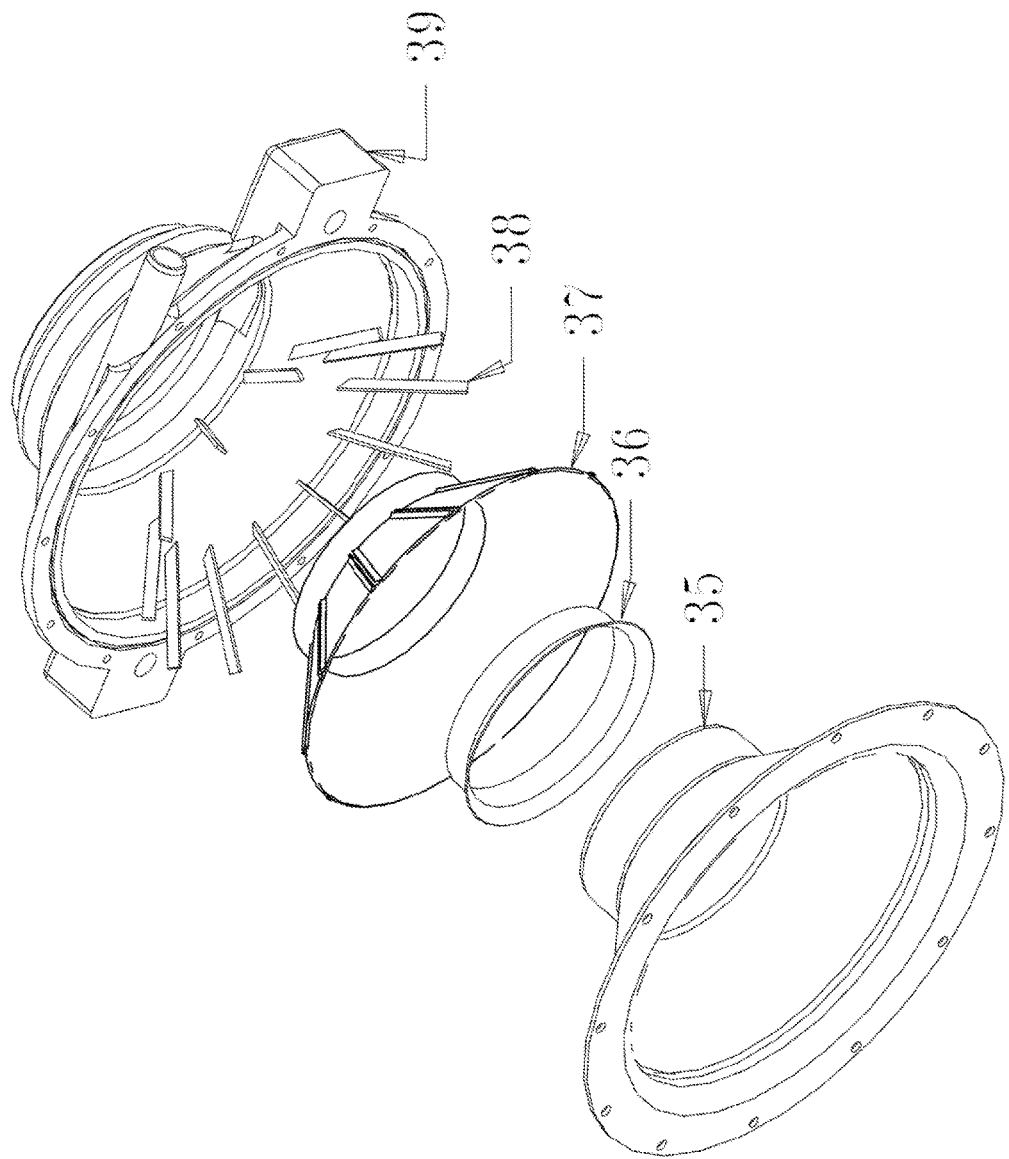
FIG. 5 is an isometric exploded view of an alternative embodiment of FIG. 4, having a magnetically driven impeller within the cooling chamber.

FIG. 5 is an exploded isometric view of another embodiment containing a Magnetically Driven Impeller. The Impeller is made of three components as shown, but could be made in one piece or more depending on materials chosen and applications. The Impeller Body 37 could be a thermoplastic material that is injection molded. This Impeller Body 37 is shown with slots to retain the Impeller Blades 38, which may be steel or a selection of steel (or other ferrous metals) and or plastic blades. The Impeller Blades 37 will be attracted to the rotating Magnets 13 in the Rotor Assembly shown in FIG. 2 and will cause the Impeller Body 37 to rotate on Impeller Bearing 36. The pumping action only occurs when the energy absorption occurs, so as to not induce pumping losses during non-braking use. The Cooling Chamber 39 is shown without internal blades as was shown in earlier embodiments.

Figure 6:
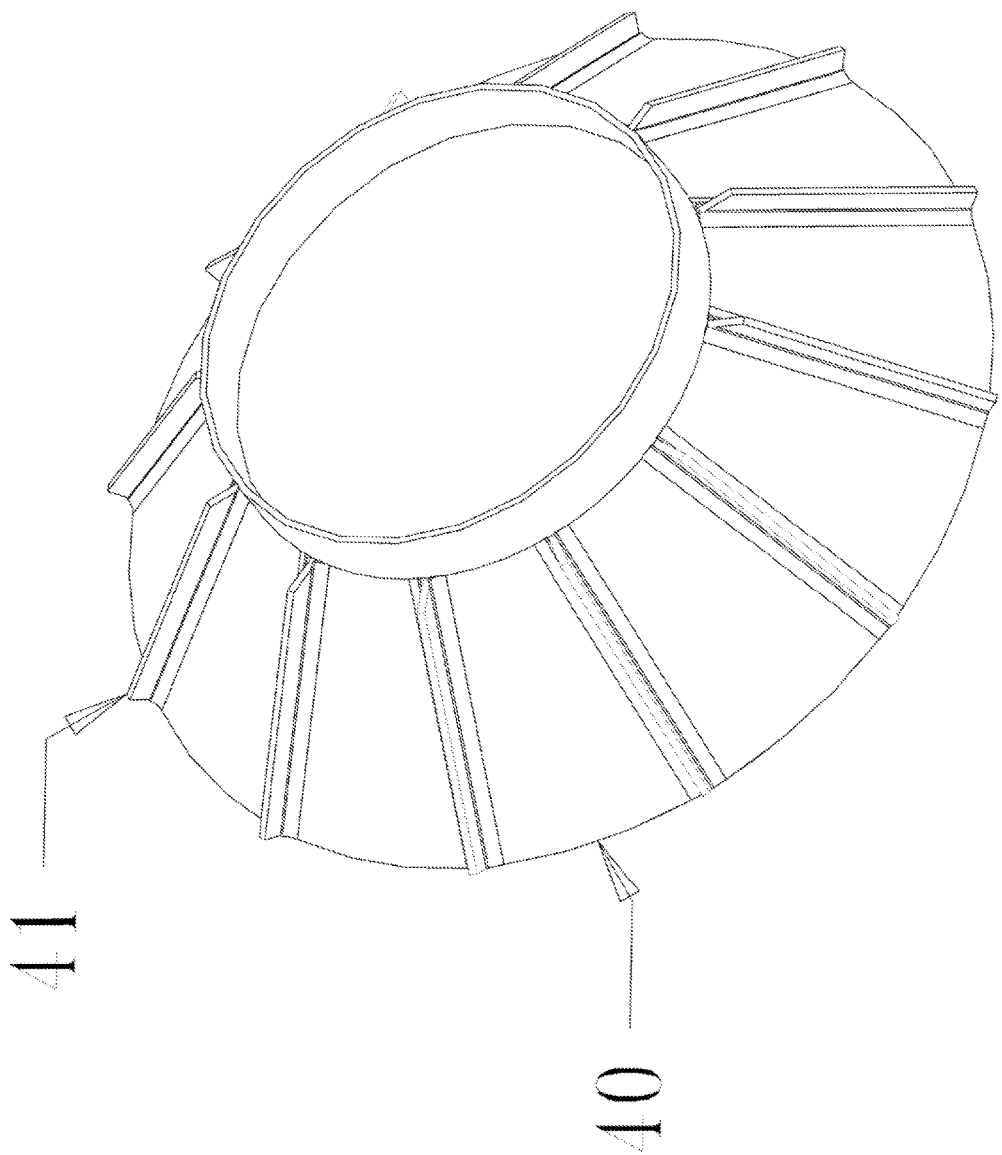
FIG. 6 is an isometric view of the magnetically driven impeller.

FIG. 6 is an isometric view of the exemplary Impeller Body 40 with the Impeller Blades 41 installed in the slots.

Figure 7:
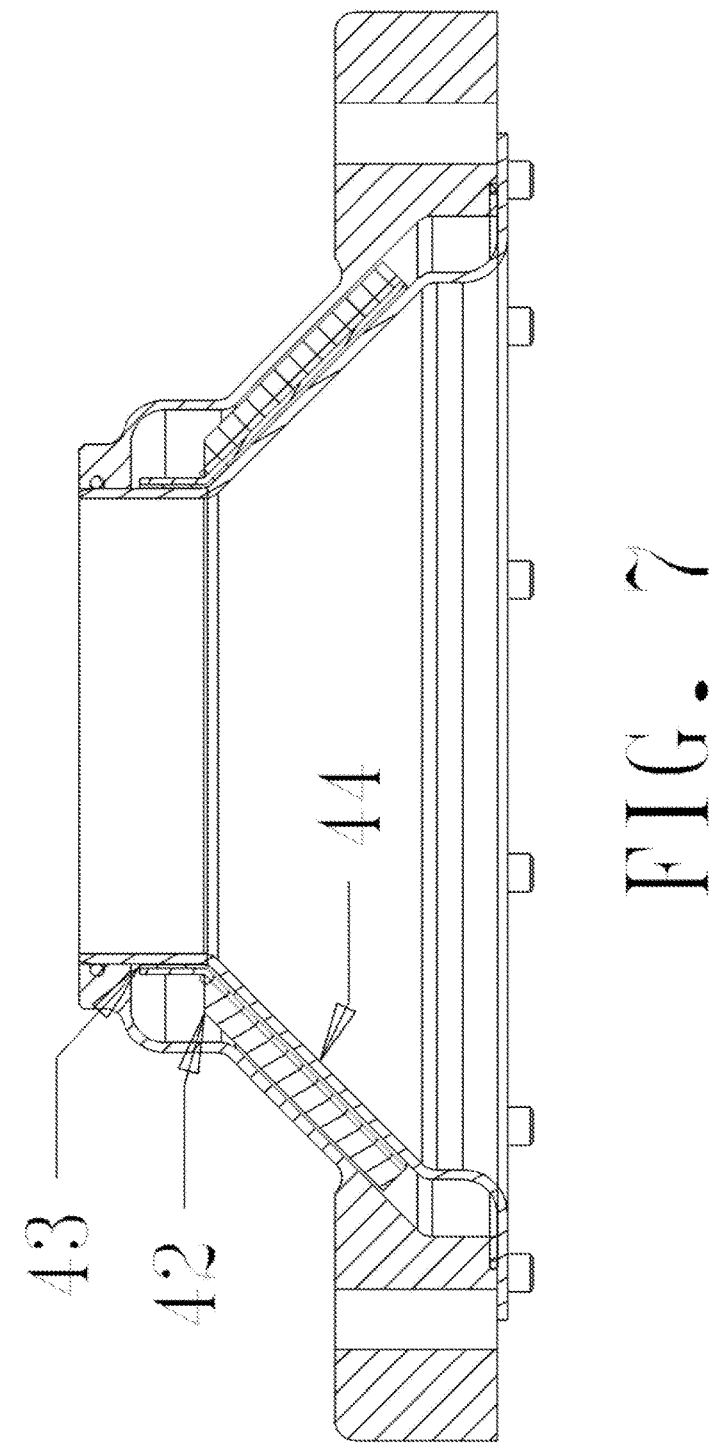
FIG. 7 is a crossectional view of the magnetically driven impeller assembly inside the cooling chamber shown in FIG. 5.

FIG. 7 is a crossectional view of the exemplary embodiment of the Magnetically Driven Impeller 42 installed with the Impeller Bearing 43 separating the Impeller Body Assembly 43 from the Inner Stamping 44.

Figure 8:
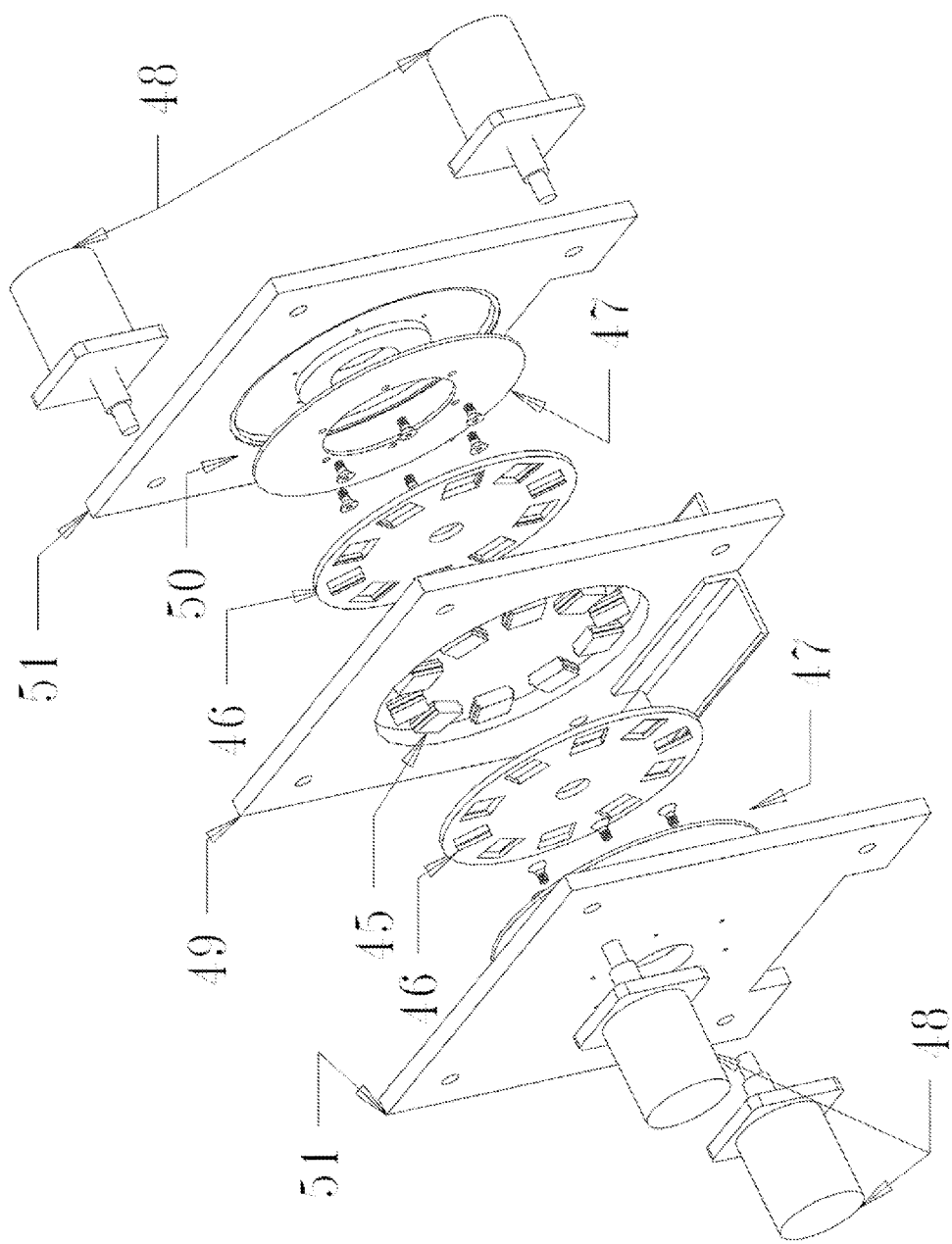
FIG. 8 is yet another embodiment, utilizing two cooling chambers, one on each side of a rotor containing magnets.

FIG. 8 is an exploded view of a second embodiment which contains two cooling chambers 51. Not shown in this embodiment are the optional magnetically driven impellers which would fit in the cavities 50 and sealed off by the Cooling Plates 47. Cooling Plates 47 can be made from any material that has the ability to produce magnetically induced eddy currents, such as copper and aluminum with low magnetic attraction. Steel, iron or other materials may also be applicable and those skilled in the arts may apply any material that is found suitable properties, not limited to those mentioned here. The Cooling Plates 47 may be attached with screws as shown or other means of fastening. Cooling Chambers 51 are attached to Actuators 48 which are attached to Mid Plate 49 which is attached to a mounting surface not shown. Magnets 45 are held between Rotors Plates 46 which are attached to a shaft, not shown. This embodiment allows axial movement of two Cooling Chambers 51 simultaneously in relation to assembly of the Magnets 45 and Rotor Plates 46, in relation to the Mid Plate 49.

Figure 9:
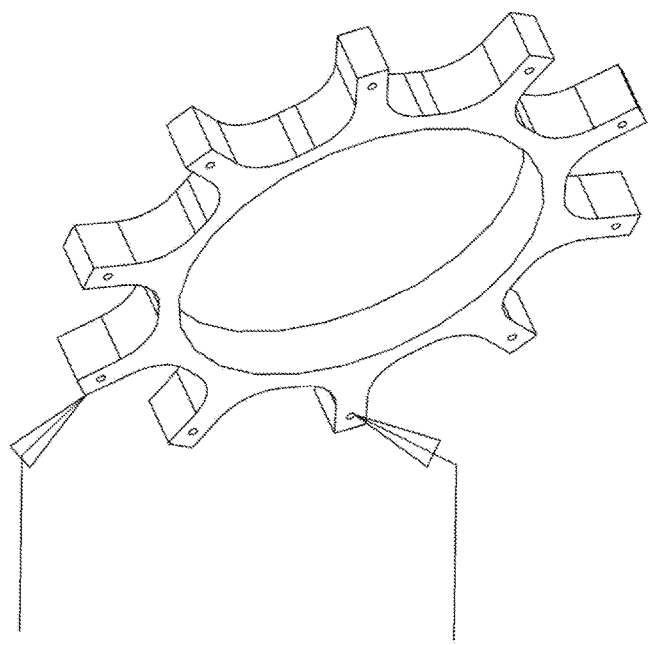
FIG. 9 is an optional magnetically driven impeller design to fit in the cooling chambers shown in FIG. 8.

FIG. 9 is an isometric view of the exemplary Magnetically Driven Impeller 52 which could be made from a non-magnetic material such as plastic, but contains Magnetic Drivers 53 that cause rotation of the Magnetically Driven Impeller 52 when it is assembled inside of the Cooling Chambers 50 shown in FIG. 8, and Cooling Chamber 51 is moved axially towards the Rotor Plates 46 containing Magnets 45. Rotor Plates 46 containing Magnets 45 are rotating on a shaft, not shown. The rotation of Magnetically Driven Impeller 52 in Cooling Chambers 51 will cause flow of a cooling liquid, said cooling liquid can be plumbed to the Cooling Chambers 51 and to a heat exchanger (not shown) if a closed loop system is desired, or the liquid could be water and could be a single pass flow to a drain in the simplest arrangement. The Magnetically Driven Impeller 52 as shown is designed to rotate and flow in either direction, but could be designed by those skilled in the art to be more efficient for unidirectional pumping. It should also be noted that the sizing and placement of Magnetic Drivers 52 is critical in several aspects; first, in radial proximity to the Magnets 45, second, the depth of insertion in the Magnetically Driver Impeller 52, and third, to be of correct sizing so as to be able to cause rotation of said Magnetically Driven Impeller 52 while at the same to not to induce unnecessary excessive thrust load on said Magnetically Driven Impeller 52 against Cooling Plates 47. Those skilled in the art would be able to easily design a substantially wear free arrangement having bearing properties and lubrication of contacting surfaces in any such arrangement.

What is claimed is:

1. An energy absorption device for providing rotational resistance, comprising:
    a rotatable shaft for transferring rotational energy to a rotor assembly,
    wherein the rotor assembly contains at least one surface with at least one magnet disposed on the surface, and wherein the rotor assembly is coupled to the shaft so that rotation of the shaft causes rotation of the member; and
    at least one non-rotating cooling chamber,
    the at least one cooling chamber being selectively positioned in axial proximity to the rotor assembly to absorb said rotational energy by shearing of eddy currents, and wherein the at least one cooling chamber increases absorption of said rotation energy by reducing the proximity to the rotor assembly;
    wherein the rotor assembly and cooling chamber are arranged concentrically.

2. The energy absorption device of claim 1, further comprising an impeller.

3. The energy absorption device of claim 1, further comprising static O-ring for sealing the at least one cooling chamber.

4. The energy absorption device of claim 1, further comprising coolant plumbing arranged to carry a coolant, the coolant plumbing having an inlet flow path and an outlet flow path.

5. The energy absorption device of claim 4, further comprising an inlet port and an outlet port on each cooling chamber.

6. The energy absorption device of claim 1, further comprising an impeller, the impeller having a concentric support structure, a rotational support structure, and a plurality of vanes, the impeller being magnetically driven rotationally.

7. The apparatus of claim 6, wherein at least one of the plurality of vanes contains ferromagnetic material which is radially disposed on the vane, the ferromagnetic material arranged opposed to surfaces of the magnets in the rotor assembly.

8. The energy absorption device of claim 7, wherein the ferromagnetic material is proportioned so as to allow rotation of the impeller while reducing thrust load on the impeller as the proximity of the cooling chamber to the rotor assembly is reduced.

9. The energy absorption device of claim 7, wherein the ferromagnetic material is proportioned so as to impede rotation of the impeller as the proximity of the cooling chamber to the rotor assembly is increased.

10. The energy absorption device of claim 6, wherein the impeller is disposed in the cooling chamber.

11. The energy absorption device of claim 1, wherein the at least one magnet comprises a plurality of magnets radially arranged on the rotor assembly, such that the magnets are adjacent to said cooling chamber and said magnetically driven impeller.

12. The energy absorption device of claim 1 wherein the at least one cooling chamber is axially movable relative to the rotor assembly.

13. The energy absorption device of claim 12, further including at least one actuator to selectively cause movement of the at least one cooling chamber between a minimal distance position and a maximal position.

14. The energy absorption device of claim 13, wherein the at least one actuator is capable of variable positioning control between the minimal distance position and the maximal position.

15. The energy absorption device of claim 13, wherein the at least one actuator includes at least two actuators, the at least two actuators synchronized to move substantially the same axial distance when positioned.

16. The energy absorption device of claim 1, further comprising a frictional braking mechanism, the frictional braking mechanism acting dynamically or statically.

17. The energy absorption device of claim 1, wherein the at least one cooling chamber is air cooled, the at least one cooling chamber comprising:
    a thermal mass;
    cooling fins that provide energy dissipation from an air flow thereover;
    wherein said air flow is created by the at least one magnet disposed on the surface of the rotor assembly.

18. The energy absorption device of claim 10, wherein the at least one cooling chamber is liquid cooled, the at least one cooling chamber comprising:

a liquid thermal mass;
a coolant flow during energy absorption;
wherein the coolant flows into an inlet and out of an outlet of the at least one cooling chamber and wherein the impeller forces the coolant from the inlet to the outlet.

19. The energy absorption device of claim 1, further comprising a control system, the control system comprising:
at least one brake force actuator;
a feedback loop system;
an actuator to adjust axial travel of the at least one cooling chamber; and
an electronic control unit.

\* \* \* \* \*